(12) United States Patent
Bao et al.

(10) Patent No.: US 12,139,426 B2
(45) Date of Patent: Nov. 12, 2024

(54) STRIP-SHAPED SPONGE BIOLOGICAL-PACKING MECHANISMS, INSTALLATION METHODS, AND DYNAMIC ADJUSTMENT METHODS THEREOF

(71) Applicant: ZHEJIANG HAIHE ENVIRONMENTAL TECHNOLOGY CO., LTD., Zhejiang (CN)

(72) Inventors: Fangfang Bao, Jinhua (CN); Jingwei Jiang, Jinhua (CN); Zhenghai Jiang, Jinhua (CN); Fengying Ni, Jinhua (CN)

(73) Assignee: ZHEJIANG HAIHE ENVIRONMENTAL TECHNOLOGY CO., LTD., Jinhua (CN)

( * ) Notice: Subject to any disclaimer, the term of this patent is extended or adjusted under 35 U.S.C. 154(b) by 235 days.

(21) Appl. No.: 17/811,864

(22) Filed: Jul. 11, 2022

(65) Prior Publication Data

US 2022/0348485 A1    Nov. 3, 2022

Related U.S. Application Data

(63) Continuation-in-part of application No. PCT/CN2021/072985, filed on Jan. 21, 2021.

(30) Foreign Application Priority Data

Jul. 31, 2020 (CN) .......................... 202010756611.4

(51) Int. Cl.
    *C02F 3/10*         (2023.01)

(52) U.S. Cl.
    CPC ........ *C02F 3/101* (2013.01); *C02F 2203/006* (2013.01)

(58) Field of Classification Search
    CPC ........ C02F 2203/006; C02F 3/10; C02F 3/00; C02F 3/101; C02F 3/109
    (Continued)

(56) References Cited

U.S. PATENT DOCUMENTS

| | | | |
|---|---|---|---|
| 2006/0124543 A1* | 6/2006 | Pehrson | C02F 3/006 210/615 |
| 2018/0244551 A1* | 8/2018 | Hasegawa | C02F 3/10 |

FOREIGN PATENT DOCUMENTS

| | | |
|---|---|---|
| CN | 2228908 Y | 6/1996 |
| CN | 101767864 A | 7/2010 |

(Continued)

OTHER PUBLICATIONS

International Search Report in PCT/CN2021/072985 mailed on Apr. 19, 2021, 7 pages.

(Continued)

*Primary Examiner* — Claire A Norris

(57) ABSTRACT

The present disclosure provides a strip-shaped sponge biological-packing mechanism, which comprises planar bracket groups distributed longitudinally, and the planar bracket groups include at least three parallel brackets. Packing units are arranged between upper and lower adjacent brackets, and the packing unit includes a sponge with a strip-shaped structure, two sides of the sponge are respectively provided with a tension belt, and a plurality of fasteners are arranged between two tension belts, two ends of the tension belt are respectively fixedly provided with a fastening, and the fastenings at both ends of the tension belt are detachably connected with two brackets respectively. The present disclosure also provides an installation method and a dynamic adjustment method of the strip-shaped sponge biological-packing mechanism.

11 Claims, 9 Drawing Sheets

(58) Field of Classification Search
USPC .......................................................... 210/395
See application file for complete search history.

(56) References Cited

FOREIGN PATENT DOCUMENTS

| CN | 204848564 U | 12/2015 |
| CN | 106379988 A | 2/2017 |
| CN | 208182689 U | 12/2018 |
| CN | 111792726 A | 10/2020 |
| CN | 212356715 U | 1/2021 |

OTHER PUBLICATIONS

Written Opinion in PCT/CN2021/072985 mailed on Apr. 19, 2021, 7 pages.

\* cited by examiner

STRIP-SHAPED SPONGE BIOLOGICAL-PACKING MECHANISMS, INSTALLATION METHODS, AND DYNAMIC ADJUSTMENT METHODS THEREOF

CROSS-REFERENCE TO RELATED APPLICATIONS

This application is a continuation-in-part application of International Patent Application No. PCT/CN2021/072985, filed on Jan. 21, 2021, which claims priority to Chinese Patent Application No. 202010756611.4, filed on Jul. 31, 2020, the contents of which are hereby incorporated by reference.

TECHNICAL FIELD

This present disclosure relates to technical field of sewage treatment devices, and in particular to strip-shaped sponge biological-packing mechanisms, installation methods, and dynamic adjustment methods thereof.

BACKGROUND

Biological packing is an important component in the biological treatment of sewage and waste gas. Because of its large surface area, it may attach a large number of microorganisms and become a hotbed of microorganisms. Sponge has the advantages of porosity, high specific surface area and easy biofilm formation, so it is widely used in biological packing. However, the existing sponge has poor tensile strength, and the porosity of the sponge becomes smaller after being pressed, thus losing its porosity and high specific surface area, which is not conducive to attaching a large number of microorganisms to the sponge and affecting the performance of biological packing. In addition, the existing biological packing still has some disadvantages, such as complex structure, easy deposition of sludge, and small volume of biological packing that may be placed in unit space, etc.

Therefore, it is hoped to provide a biological packing with simple structure, which can give full play to the advantages of the sponge.

SUMMARY

Some embodiments of the present disclosure provide a strip-shaped sponge biological-packing mechanism, which includes at least two layers of planar bracket groups longitudinally distributed and parallel to each other. The planar bracket groups include at least three brackets which are parallel to each other or distributed in a grid shape; the brackets between upper and lower adjacent planar bracket groups are in one-to-one correspondence; a plurality of packing units arranged along a length direction of the brackets are arranged between upper and lower adjacent brackets; the packing units include sponges with a strip-shaped structure; two sides of a sponge are respectively provided with a tension belt arranged along a length direction of the sponge; two ends of the tension belt respectively extend outwards relative to two ends of the sponge, and a plurality of fasteners distributed along the length direction of the sponge for fixing the sponges are arranged between two tension belts; the two ends of the tension belt are respectively fixedly provided with a fastening, and the fastenings at both ends of the tension belt are detachably connected with two brackets respectively.

In some embodiments, the sponges are provided with a plurality of first through holes distributed along the length direction of the sponge; the tension belts are provided with a plurality of second through holes corresponding to the first through holes one by one; the fasteners are hat-pegs with a dumbbell-shaped structure; middle parts of the hat-pegs are sleeved in the first through holes and the second through holes; protruding parts relative to the middle parts of two ends of the hat-pegs are respectively attached to outer sides of the two tension belts; and a distance between adjacent fasteners is within a range of 20-100 cm.

In some embodiments, the fasteners are strip-shaped sewing threads arranged along the length direction of the sponge; the strip-shaped sewing threads pass through the two tension belts and the sponge, and the strip-shaped sewing threads are continuously sewn or sewed in sections at a spacing within a range of 20-100 cm.

In some embodiments, the tension belt is made of plastic, nylon, or metal.

In some embodiments, corresponding ends of the two tension belts are fixedly connected, and the corresponding ends of the two tension belts are fixedly connected with a fastening at the same time.

In some embodiments, the fastening is a hook which is hooked on the bracket or a binding head formed by extension sections at both ends of the tension belt directly bound to the bracket.

In some embodiments, a length of the sponge is within a range of 150-600 cm, a width of the sponge is within a range of 5-20 cm, a thickness of the sponge is within a range of 0.6-3 cm, and a width of the tension belt is within a range of 0.5-3 cm.

In some embodiments, a spacing between adjacent packing units on the same upper and lower adjacent brackets is within a range of 4-15 cm; and a distance between two adjacent brackets in the same planar bracket group is within a range of 5-20 cm.

In some embodiments, the planar bracket group includes a first adjusting mechanism and a second adjusting mechanism; the first adjusting mechanism adjusts a distance between adjacent brackets in the same planar bracket group, and the second adjusting mechanism adjusts a spacing between adjacent packing units.

In some embodiments, a bolt is arranged at a tail end of the fastener, and the bolt is connected with an elastic adjusting mechanism, and the elastic adjusting mechanism adjusts a tightness of the fastener squeezing the sponge by rotating the bolt.

Some embodiments of the present disclosure provide an installation method of a strip-shaped sponge biological-packing mechanism. The installation method comprises: tightly attaching a tension belt to two sides of a sponge with a strip-shaped structure respectively, so that two ends of the tension belt protrude relative to two ends of the sponge respectively; fixing the sponge between two tension belts by a fastener, and fixedly connecting corresponding ends of the two tension belts and fixing the corresponding ends of the two tension belts on a fastening, so as to form a packing unit; fixedly installing brackets distributed in a rectangular array in a biological contact area of the biological contact oxidation treatment device for treating wastewater and waste gas by a biological contact method, so as to form at least two layers of planar bracket groups distributed longitudinally and parallel to each other, cause a distance between two adjacent brackets in the same planar bracket group being within a range of 5-20 cm, and cause the brackets between upper and lower adjacent planar bracket groups being in one-to-one correspondence; installing packing units vertically on upper and lower adjacent brackets in a tight manner from top to bottom through two fastenings in a hooking or a binding manner, and installing a plurality of packing units between the upper and lower adjacent brackets in the same manner along a length direction of the brackets, so that all packing units are distributed in the rectangular array, and controlling a spacing between adjacent packing units on the same upper and lower adjacent brackets to be within a range of 4-15 cm.

Some embodiments of the present disclosure provide a dynamic adjustment method of a strip-shaped sponge biological-packing mechanism. The method comprises: obtaining a candidate installation scheme; determining a target installation scheme based on the candidate installation scheme; determining a dynamic adjustment scheme based on actual treatment effect of the target installation scheme; and performing a dynamic adjustment based on the dynamic adjustment scheme.

In some embodiments, the determining a dynamic adjustment scheme based on actual treatment effect of the target installation scheme includes executing a sewage treatment based on the target installation scheme; obtaining real-time sewage treatment effect; and determining the dynamic adjustment scheme based on the real-time sewage treatment effect.

BRIEF DESCRIPTION OF THE FIGURES

The present disclosure will be further explained by way of exemplary embodiments, which will be described in detail through the attached figures. These embodiments are not restrictive, and in these embodiments, the same numbers indicate the same structures, wherein.

DETAILED DESCRIPTION OF THE EMBODIMENTS

Figure 1:
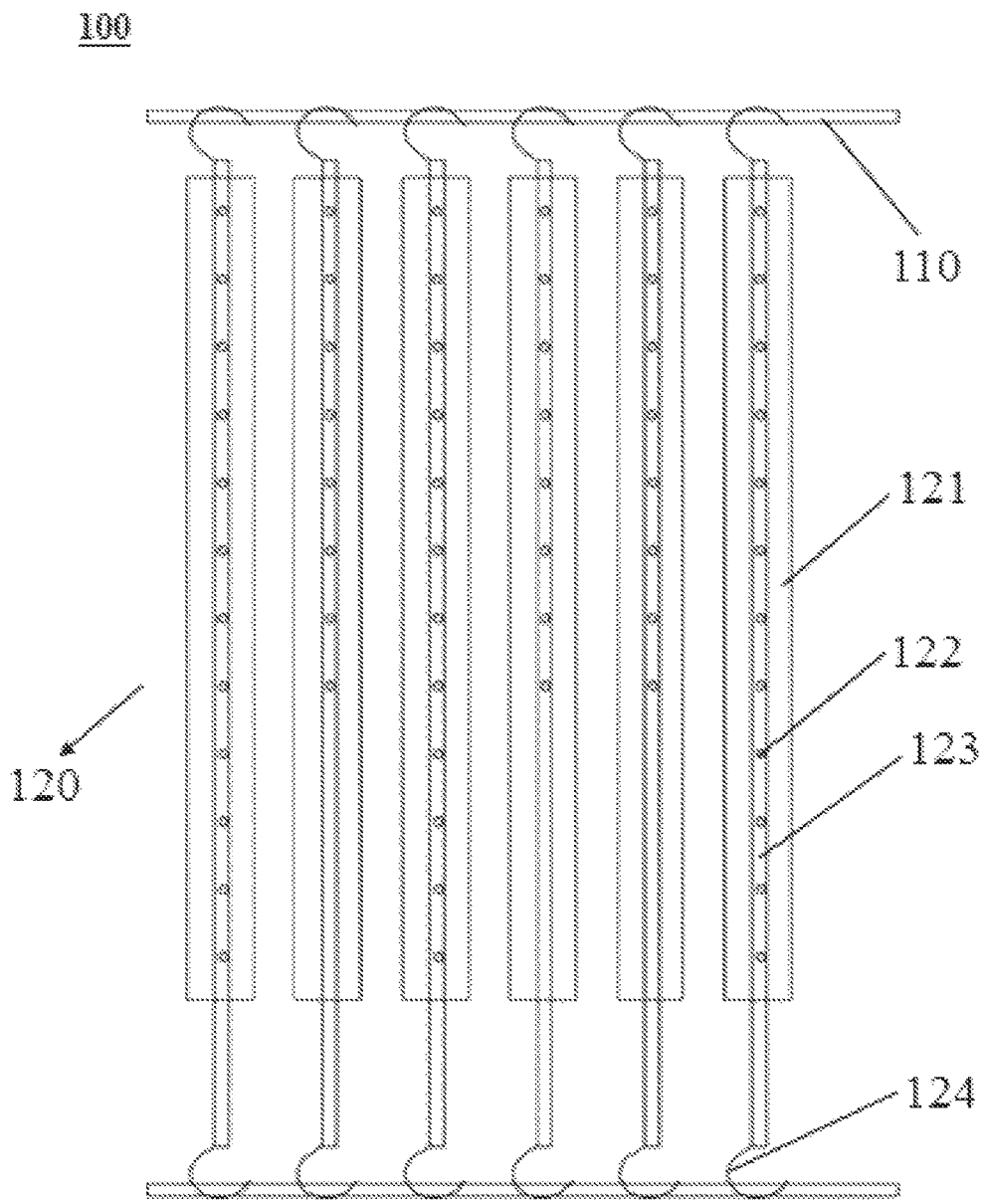
FIG. 1 is a structural schematic diagram of a strip-shaped sponge biological-packing mechanism according to some embodiments of the present disclosure.

In order to more clearly explain the technical scheme of the embodiment of the present disclosure, the following will briefly introduce the figures that need to be used in the description of the embodiment. Obviously, the figures in the following description are only some examples or embodiments of the present disclosure. For those of ordinary skill in the art, the present disclosure may also be applied to other similar situations according to these figures without any creative effort. Unless it is obvious from the linguistic environment or otherwise stated, the same reference numerals in the figure represent the same structures or operations.

It should be understood that "system", "device", "unit" and/or "module" as used herein is a method for distinguishing different components, elements, parts, parts or assemblies of different levels. However, if other words may achieve the same purpose, they may be replaced by other expressions.

As shown in the present disclosure and claims, unless the context clearly indicates exceptional circumstances, words such as "a", "an", "a kind of" and/or "the" are not specifically singular, but also include plural. Generally speaking, the terms "including" and "containing" only imply the inclusion of clearly identified steps and elements, but these steps and elements do not constitute an exclusive list, and methods or devices may also contain other steps or elements.

A flowchart is used in the present disclosure to explain the operations performed by the system according to the embodiment of the present disclosure. It should be understood that the preceding or following operations are not necessarily performed exactly in order. On the contrary, the steps may be processed in reverse order or simultaneously. Meanwhile, other operations may be also added to these procedures, or one or more operations may be removed from these procedures.

Figure 2:
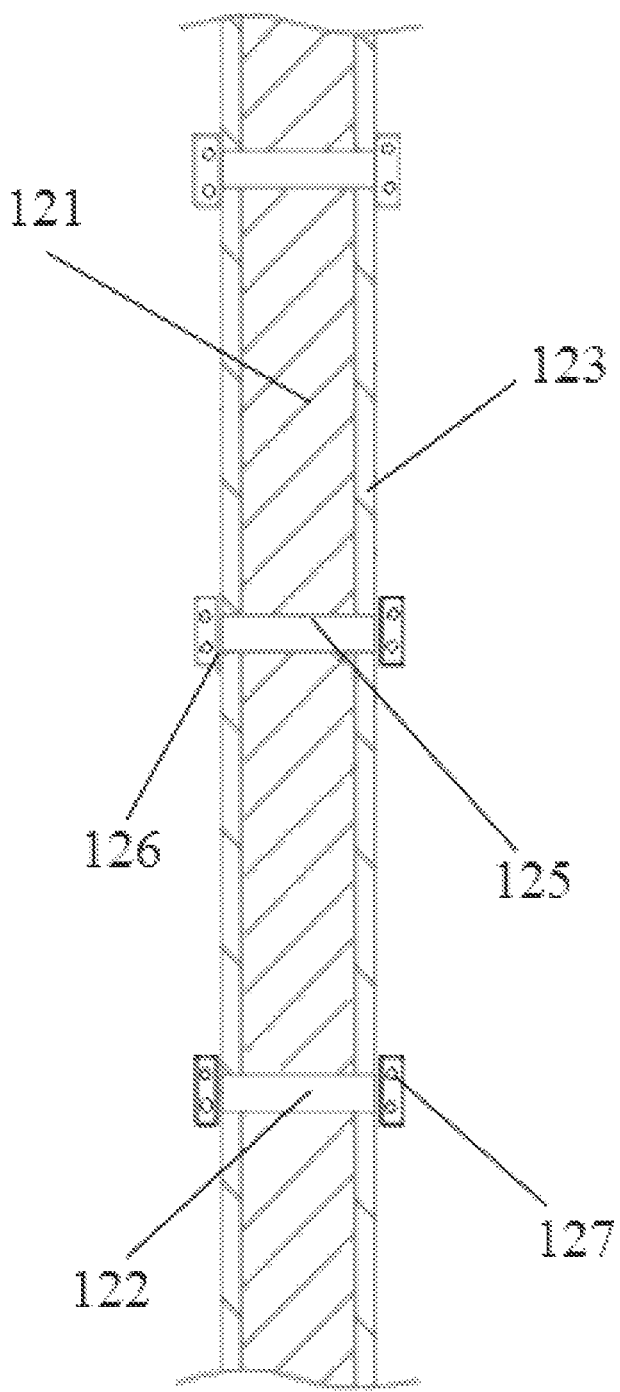
FIG. 2 is a connection schematic diagram of the strip-shaped sponge biological-packing mechanism according to some embodiments of the present disclosure.
Figure 3:
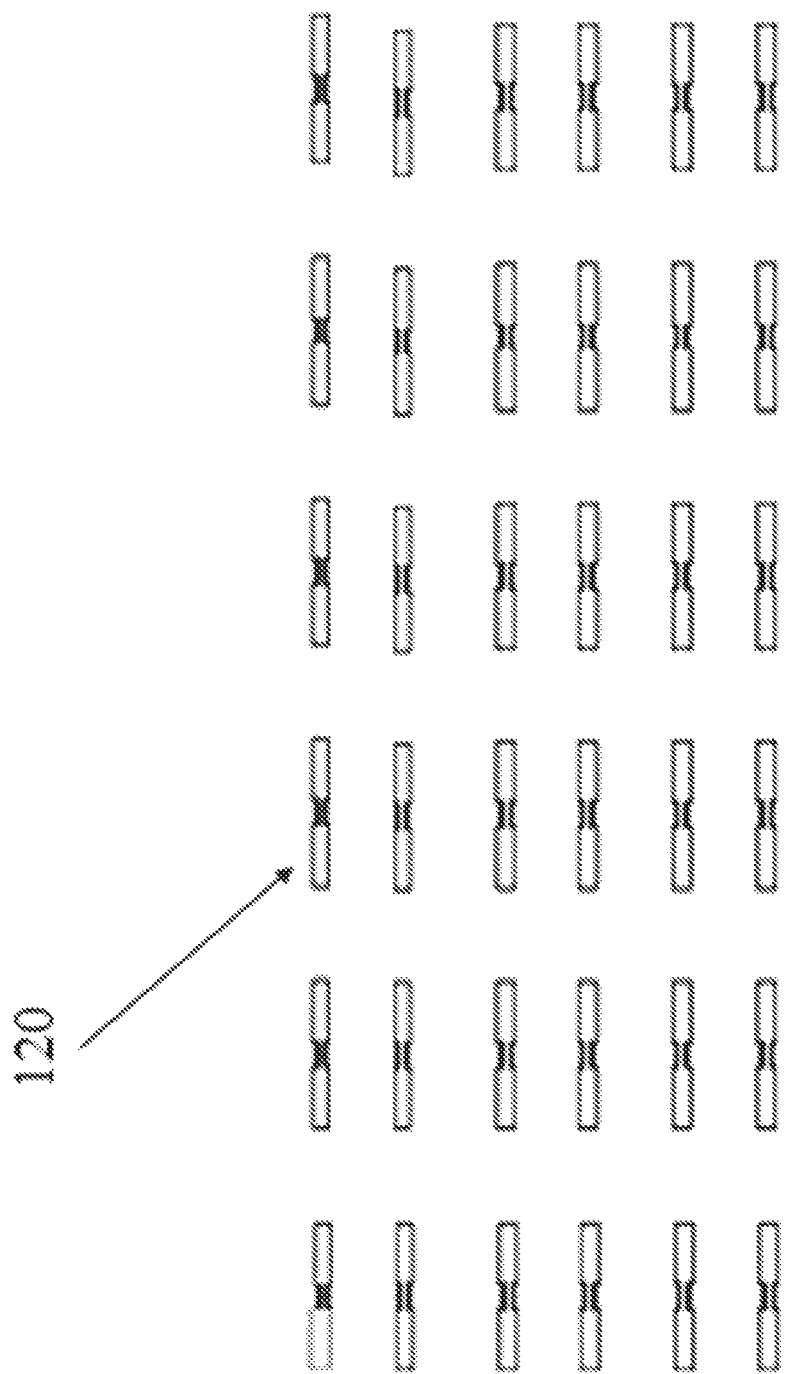
FIG. 3 is a schematic diagram of a distribution of the strip-shaped sponge biological-packing mechanism according to some embodiments of the present disclosure.
Figure 4:
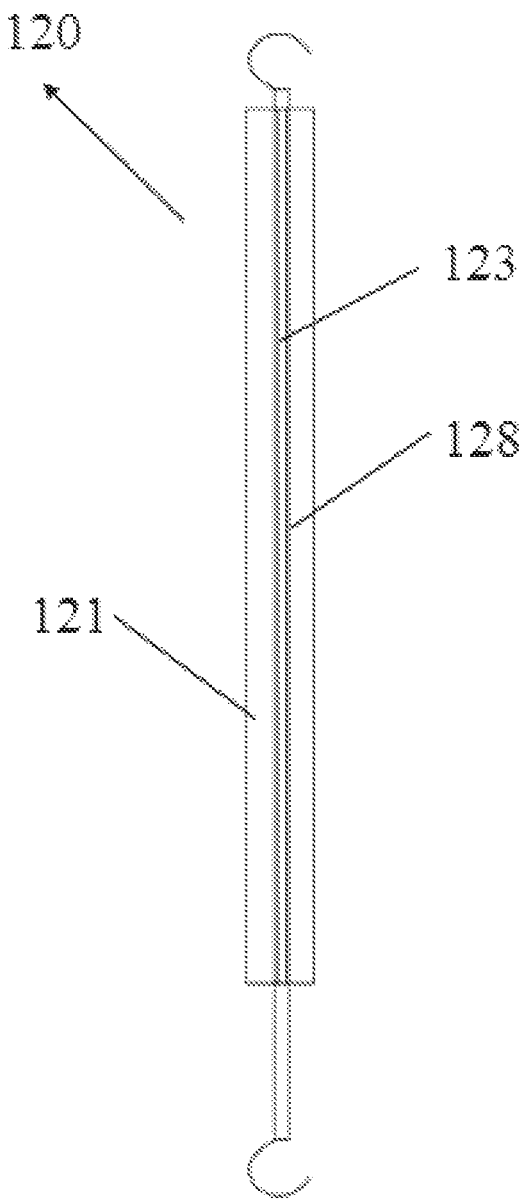
FIG. 4 is a structural schematic diagram of a packing unit of the strip-shaped sponge biological-packing mechanism according to some embodiments of the present disclosure.

FIG. 1 is a structural schematic diagram of a strip-shaped sponge biological-packing mechanism according to some embodiments of the present disclosure; FIG. 2 is a connection schematic diagram of the strip-shaped sponge biological-packing mechanism according to some embodiments of the present disclosure; FIG. 3 is a schematic diagram of a distribution of the strip-shaped sponge biological-packing mechanism according to some embodiments of the present disclosure; FIG. 4 is a structural schematic diagram of a packing unit of the strip-shaped sponge biological-packing mechanism according to some embodiments of the present disclosure. The strip-shaped sponge biological-packing mechanism 100 disclosed in the embodiments of the present disclosure will be described in detail below. It should be noted that the following embodiments are only used to explain the present disclosure, and do not constitute a limitation on the application.

As shown in FIG. 1, some embodiments of the present disclosure provide a strip-shaped sponge biological-packing mechanism, which includes at least two layers of planar bracket groups longitudinally distributed and parallel to each other. The planar bracket groups include at least three brackets 110 which are parallel to each other or distributed in a grid shape. The brackets 110 between the upper and lower adjacent planar bracket groups are in one-to-one correspondence, a plurality of packing units 120 arranged along the length direction of the brackets 110 are arranged between the upper and lower adjacent brackets 110, the packing units 120 include sponges 121 with a strip-shaped structure, two sides of a sponge are respectively provided with a tension belt 123 arranged along the length direction of the sponge, two ends of the tension belt 123 respectively extend outwards relative to the two ends of the sponge 121, a plurality of fasteners 122 distributed along the length direction of the sponge are arranged between the two tension belts 123 for fixing the sponge, a fastening 124 is fixed at both ends of the tension belt 123 respectively, and the fastenings 124 at both ends of the tension belt 1213 are detachably connected with the two brackets 110.

The planar bracket group may refer to a planar structure composed of multiple brackets, such as a triangular planar structure, a quadrilateral planar structure, a regular or irregular polygonal planar structure, a grid planar structure, etc. In some embodiments, the strip-shaped sponge biological-packing mechanism may include at least two layers of planar support groups longitudinally distributed and parallel to each other.

The brackets 110 are used to support and maintain the basic morphological structure of the whole mechanism. In some embodiments, the brackets 110 may be made of a material with a certain hardness into a bar shape, a column shape, or the like according to requirements. Each bracket may be used alone or a plurality of brackets may be used in combination. Various spatial structures may be formed by physically connecting a plurality of brackets 110. For example, at least three brackets 110 parallel to each other or distributed in a grid shape may form a planar bracket group, and the brackets 110 between the upper and lower adjacent planar bracket groups may be in one-to-one correspondence.

The packing unit 120 is used for setting biological packing. In some embodiments, the packing unit 120 may be disposed between the upper and lower adjacent brackets 110, and a plurality of packing units 120 may be disposed along the length direction of the brackets 110. In some embodiments, the packing unit 120 may be a biological packing with a large surface area, which may attach a large number of microorganisms and become a hotbed of microorganisms. For example, the packing unit 120 may be a foam with open cells, the sponge 121, etc.

When a spacing is too small, it is difficult for sewage to smoothly pass through the space between adjacent packing units 120, which may cause sludge in sewage to be deposited between packing units 120. When a width is too large, the number of packing units 120 in a unit space will be small, thus the number of microorganisms attached to the packing units 120 will be small, and the sewage treatment capacity will be low. In some embodiments, the spacing between adjacent packing units 120 on the same upper and lower adjacent brackets 110 may be within a range of 4-15 cm, and a distance between two adjacent brackets 110 in the same planar bracket group may be within a range of 5-20 cm. In some embodiments, the spacing between adjacent packing units 120 on the same upper and lower adjacent brackets 110 may be within a range of 8-12 cm, and the distance between two adjacent brackets 110 in the same planar bracket group may be within a range of 8-15 cm. Within the spacing, sewage may smoothly pass through the packing units 120, and as many packing units 120 may be placed in the unit space as possible, as shown in FIG. 3.

In some embodiments, the distance between the brackets 110 may be adjusted as required. In a specific embodiment, the planar bracket group may include a first adjusting mechanism, through which the spacing between adjacent brackets 110 in the same planar bracket group may be adjusted. For example, the first adjusting mechanism may include a motor and a transmission mechanism, the bracket 110 may be connected with the transmission mechanism, so that the bracket 110 may be driven to move by the rotation of the motor, thereby adjusting the distance between the brackets 110.

In some embodiments, the spacing between the packing units 120 may be adjusted as required. In a specific embodiment, the planar bracket group may include a second adjusting mechanism through which the spacing between adjacent packing units 120 may be adjusted. For example, the second adjusting mechanism may include a motor and a transmission mechanism, and each packing unit 120 may be fixedly connected with the transmission mechanism, so that the packing units 120 may be driven to move by the rotation of the motor, thereby adjusting the spacing between the packing units 120.

The sponge 121 is a kind of porous material with the advantages of porosity, high specific surface area, and easy biofilm formation, which is widely used in biological treatment engineering. The sponge 121 is usually a high molecular polymer material, such as polyurethane material. The sponge 121 may be made into various shapes as required, for example, a ball, a block, a strip, or the like.

When a size of the sponge 121 is too large, it is difficult for the sewage to exchange with the water in the sponge 121 in time, and the microorganisms attached to the sponge 121 have extremely low efficiency in sewage treatment, thus occupying space, but cannot play a corresponding role. When the size of the sponge 121 is too small, the volume of the sponge 121 that may be placed in a unit space is small, and the number of microorganisms attached to the sponge 121 is small, thus the efficiency of sewage treatment is low. In some embodiments, a length of the sponge 121 may be within a range of 150-600 cm, a width of the sponge 121 be within a range of 5-20 cm, and a thickness of sponge 121 may be within a range of 0.6-3 cm. In some embodiments, a length of the sponge 121 may be within a range of 200-500 cm, a width of the sponge 121 be within a range of 8-16 cm, and a thickness of the sponge 121 be within a range of 1-2.5 cm. In some embodiments, a length of the sponge 121 may be within a range of 300-450 cm, a width of the sponge 121 be within a range of 10-15 cm, and a thickness of the sponge 121 be within a range of 1-2 cm. Due to the porous structure of the sponge, it may absorb a large number of microorganisms. Within the size range, the sponge has the highest utilization rate. The microorganisms attached to the sponge may adhere to the whole sponge, and the microorganisms attached to the sponge may treat the sewage passing through the surface of the sponge.

The tension belt 123 is used to fix the sponge 121 (with the fastener 122). The tension belt 123 may be in the form of a belt in cooperation with the belt-shaped sponge 121, and the tension belt 123 may be arranged on both sides of the sponge 121 along the length direction of the sponge 121 to facilitate fixation.

In some embodiments, the width of the tension belt 123 may be within a range of 0.5-3 cm. In some embodiments, the width of the tension belt 123 may be within a range of 1-2.5 cm. In some embodiments, the width of the tension belt 123 may be within a range of 1-2 cm. Because the tension belt 123 and the sponge 121 have a certain width difference, the sponge 121 may be well fixed, and the outer surface of the sponge 121 may be exposed as much as possible, so that the contact area with sewage may be increased, thus the adhesion area of microorganisms may be increased, so that the sewage treatment capacity may be improved.

In some embodiments, the tension belt 123 may be made of a material that is firm, not easy to age, and small temperature difference elasticity. In some embodiments, the tension belt 123 may be made of plastic, nylon, or metal materials to meet the service performance of the tension belt 123.

The fastening 124 is used to connect the packing unit 120 with the bracket 110. In some embodiments, the fastening 124 may be connected with any part of the packing unit 120 (such as the sponge 121, the tension belt 123, etc.). In some embodiments, in order to reduce the pulling force borne by the sponge 121, and avoid the damage of the sponge 121 and its performance, the two ends of the tension belt 123 may extend outward relative to the two ends of the sponge 121, and the two ends of the tension belt 121 may be respectively fixed with a fastening 124, which may be detachably connected with the two brackets 110.

In a specific embodiment, the fastening 124 may be a hook that may be hooked on the bracket 110. In some embodiments, the two end extensions of the tension belt 124 may be directly bound to the bracket to form a binding head.

In some embodiments, the corresponding ends of the two tension belts 123 may be fixedly connected, and the corresponding ends of the two tension belts 123 may be fixedly connected with a fastening 124 at the same time. The two ends of the two tension belts 123 are respectively fixedly connected, and the corresponding ends of the tension belts 123 are simultaneously fixed on a fastening 124, so that a packing unit 120 may be installed on the bracket 110 by only two fastenings 124.

The fastener 122 is used to fix the sponge 121 (with the tension belt 123). In some embodiments, the fasteners may be distributed along the length direction of the sponge 121, which are arranged between the two tension belts 123. The fasteners 122 may be evenly distributed or unevenly distributed.

As shown in FIG. 2, in some embodiments, the sponge 121 is provided with a plurality of first through holes 125 distributed along the length direction of the sponge 121, and the tension belt 123 is provided with a plurality of second through holes 126 corresponding to the first through holes 125. The fastener 122 may be a dumbbell-shaped hat-peg, the middle part of the hat-peg is sleeved in the first through holes 125 and the second through holes 126, and the protruding parts of the two ends of the hat-peg relative to the middle part are respectively attached to the outer sides of the two tension belts 123. The sponge 121 is fixed by the hat-peg matched with the tension belt 123, which is firm and convenient to install. In some embodiments, a distance between adjacent fasteners 122 may be within a range of 20-100 cm.

In some embodiments, a bolt 127 is arranged at the end of the fastener 122, and the bolt 127 is connected with an elastic adjusting mechanism, which may adjust the tightness of the fastener 122 squeezing the sponge 121 by rotating the bolt 127. In a specific embodiment, the fastener 122 may be two plates for clamping the sponge 121, and at least one bolt 127 is respectively arranged at both ends of the plates. The bolt 127 is fixedly sleeved with a turbine, and a worm connected with a motor may drive the turbine to rotate, thereby driving several bolts 127 on one side of the same sponge 121 to be tightened or loosened. When the bolts 127 are tightened, the squeezing of the sponge 121 by the fastener 122 is enhanced; when the bolts 127 is loosened, the squeezing of the sponge 121 by the fastener 122 on is weakened, so that the tightness of the sponge 121 may be adjusted.

As shown in FIG. 4, in some embodiments, the fastener 122 is a strip-shaped sewing thread 128 arranged along the length direction of the sponge 121, and the strip-shaped sewing thread 128 passes through the two tension belts 123 and the sponge 121, and the strip-shaped sewing thread 128 is continuously sewed or sewed in sections at a spacing within a range of 20-100 cm. The sponge 121 is directly fixed on the tension belt 123 by sewing threads, which is more convenient for processing.

Some embodiments of the present disclosure also provide an installation method of the strip-shaped sponge biological-packing mechanism, which includes the following steps.

Two tension belts 123 are tightly attached to two sides of a sponge 121 with a strip-shaped structure respectively, so that two ends of the tension belts 123 protrude relative to the two ends of the sponge 121; the sponge 121 is fixed between the two tension belts 123 by a fastener 122, and corresponding ends of the two tension belts 123 are fixedly connected and fixed on a fastening 124, so as to form a packing unit 120.

The brackets 110 distributed in rectangular array are fixedly installed in a biological contact area of the biological contact oxidation treatment device for treating waste water and waste gas by biological contact method, so as to form at least two layers of planar bracket groups distributed longitudinally and parallel to each other, cause a distance between two adjacent brackets 110 in the same planar bracket group being within a range of 5-20 cm, and cause the brackets 110 between the upper and lower adjacent planar bracket groups being in one-to-one correspondence.

The packing units 120 are installed vertically on upper and lower adjacent brackets 110 in a tight manner from top to bottom through two fastenings 124 in a hooking or a binding manner, and a plurality of packing units 120 are installed between the upper and lower adjacent brackets 110 in the same way along the length direction of the brackets 110, so that all packing units 120 are distributed in the rectangular array, and a spacing between adjacent packing units 120 on the same upper and lower adjacent brackets 110 are controlled to be within a range of 4-15 cm.

Figure 5:
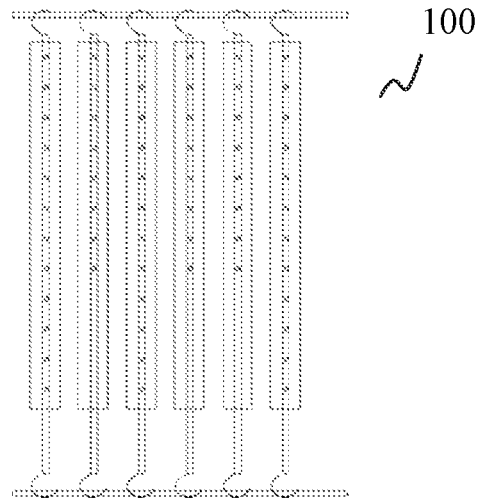
FIG. 5 is an application scenario diagram of a dynamic adjustment method of the strip-shaped sponge biological-packing mechanism according to some embodiments of the present disclosure.
Figure 5:
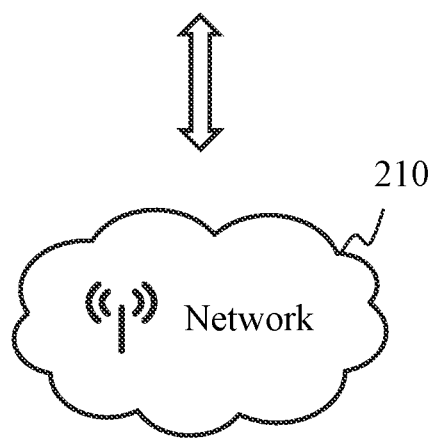
Figure 5:
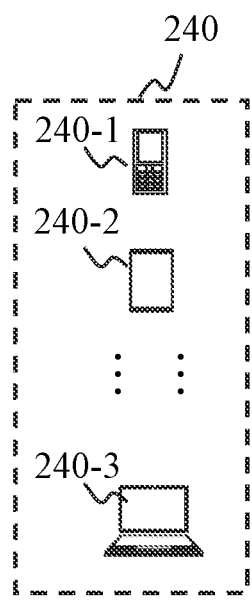
Figure 5:
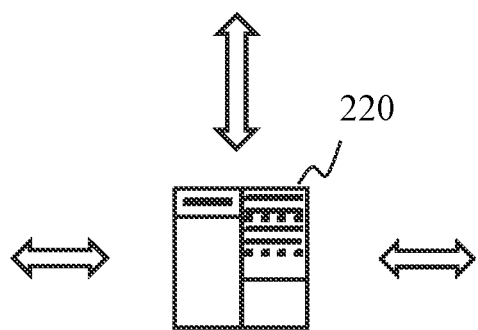
Figure 5:
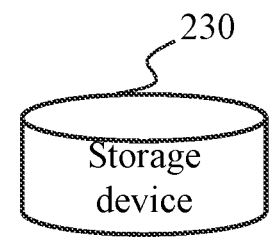

FIG. 5 is an application scenario diagram of a dynamic adjustment method of the strip-shaped sponge biological-packing mechanism according to some embodiments of the present disclosure.

As shown in FIG. 5, a typical application scenario 200 of the dynamic adjustment method of the strip-shaped sponge biological-packing mechanism provided by some embodiments of the present disclosure may include a strip-shaped sponge biological-packing mechanism 100, a network 210, a server 220, a storage device 230 and one or more terminal devices 240. All links in dynamic adjustment may be monitored by implementing the methods and/or processes disclosed in the present disclosure.

The strip-shaped sponge biological-packing mechanism 100 may refer to the related descriptions of FIGS. 1-4 and will not be described in detail here.

The network 210 may facilitate the exchange of information and/or data. In some embodiments, one or more components in the application scenario 100 (e.g., the server 220, the terminal device 240, etc.) may send information and/or data to another component in the application scenario 200 via the network 210.

The server 220 may be set in places including but not limited to a control room, a management center, etc. The server 220 may communicate with the terminal device 240 and the storage device 230 to provide various functions of application scenario 200. In some embodiments, the server 220 may receive data from the terminal device 240 via, for example, the network 210 to dynamically adjust the strip-shaped sponge biological-packing mechanism 100.

In some embodiments, the server 220 may be a single server or a group of servers. In some embodiments, the server 220 may be connected to the network 210 locally or remotely. In some embodiments, the server 220 may be implemented on a cloud platform.

In some embodiments, the terminal device 240 may receive a user request and send information related to the request to the server 220 via the network 210. For example, the terminal device 240 may receive a request from a user and send information related to the request to the server 220 via the network 210. The terminal device 240 may also receive information from the server 220 via the network 210. For example, the terminal devices 240 may receive information about the strip-shaped sponge biological-packing mechanism 100 from the server 220. The determined one or more pieces of information may be displayed on the terminal devices 240.

In some embodiments, the terminal device 240 may include a mobile device 240-1, a tablet computer 240-2, a laptop computer 240-3, an in-vehicle device, or the like, or any combination thereof. In some embodiments, the terminal device 240 may be fixed and/or mobile. For example, the terminal device 240 may be directly installed on the server 220 and become a part of the server 220. For another example, the terminal device 240 may be a mobile device, and relevant staff may take the terminal device 240 to a position far away from the server 220 and the strip-shaped sponge biological-packing mechanism 100, the terminal device 240 may be connected and/or communicated with the server 220 and/or the strip-shaped sponge biological-packing mechanism 100 through the network 210.

In some embodiments, the storage device 230 may be connected to the network 210 to communicate with one or more components of the application scenario 200 (for example, the server 220, the terminal device 240). In some embodiments, the storage device 230 may be part of the server 220.

The storage device 230 may store data and/or instructions. The data may include data related to the user, the terminal device 240, etc. In some embodiments, the storage device 230 may store the data obtained from the terminal device 240 and/or the strip-shaped sponge biological-packing mechanism 100. In some embodiments, the storage device 230 may store data and/or instructions used by the server 220 to execute or use to accomplish the exemplary methods described in the present disclosure.

In some embodiments, the storage device 230 may include mass storage, mobile storage, volatile read-write memory, read-only memory (ROM), or the like, or any combination thereof. In some embodiments, the storage device 230 may be implemented on a cloud platform.

Figure 6:
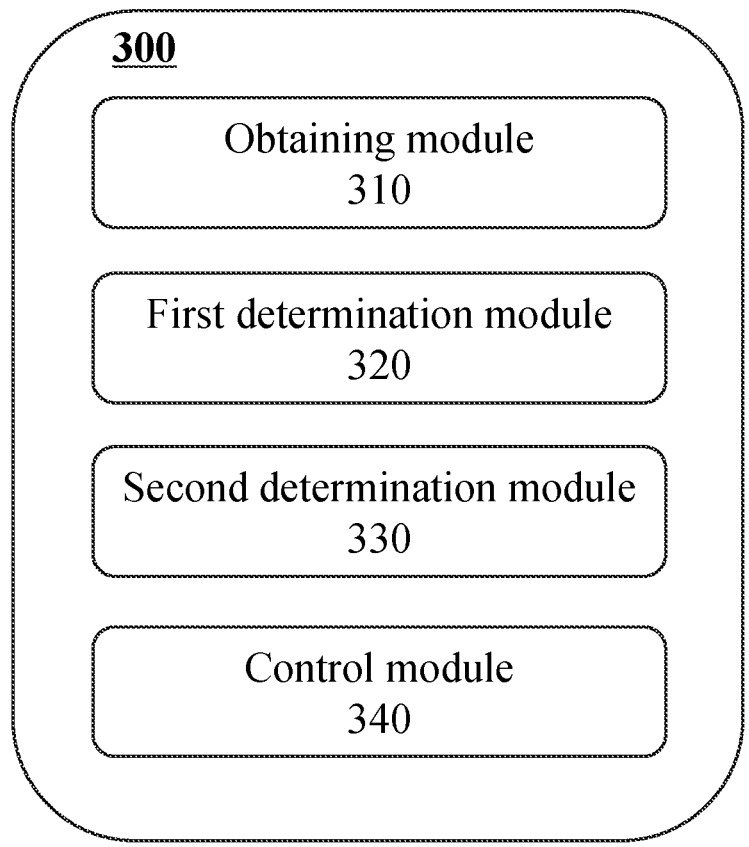
FIG. 6 is a block diagram of a dynamic adjustment system of the strip-shaped sponge biological-packing mechanism according to some embodiments of the present disclosure.

FIG. 6 is a block diagram of a dynamic adjustment system 300 of the strip-shaped sponge biological-packing mechanism according to some embodiments of the present disclosure.

As shown in FIG. 6, the dynamic adjustment system 300 of the strip-shaped sponge biological-packing mechanism may include an obtaining module 310, a first determination module 320, a second determination module 330, and a control module 340.

The obtaining module 310 may be used to obtain a candidate installation scheme.

The first determination module 320 may be used to determine a target installation scheme based on the candidate installation scheme.

The second determination module 330 may be used to determine a dynamic adjustment scheme based on actual treatment effect of the target installation scheme. In some embodiments, the second determination module may be further used to perform sewage treatment based on the target installation scheme, obtain real-time sewage treatment effect, determine the dynamic adjustment scheme based on the real-time sewage treatment effect. More details about determining the dynamic adjustment scheme may be found elsewhere in the present disclosure, e.g., FIGS. 7 and 8, and the relevant descriptions.

The control module 340 may be used to dynamic adjust based on the dynamic adjustment scheme.

It should be noted that the above descriptions of the dynamic adjustment system 300 and its modules of the strip-shaped sponge biological-packing mechanism are for convenience of description only, and the above descriptions cannot limit the scope of the present disclosure to the illustrated embodiment. It may be understood that for those skilled in the art, after knowing the principle of the system, it is possible to arbitrarily combine various modules or form a subsystem to connect with other modules without deviating from this principle. In some embodiments, the obtaining module 310, the first determination module 320, the second determination module 330, and the control module 340 disclosed in FIG. 6 may be different modules in a system, or one module may realize the functions of two or more modules mentioned above. For example, each module may share a memory module, and each module may also have its own memory module. Such variations are within the scope of protection of the present disclosure.

Figure 7:
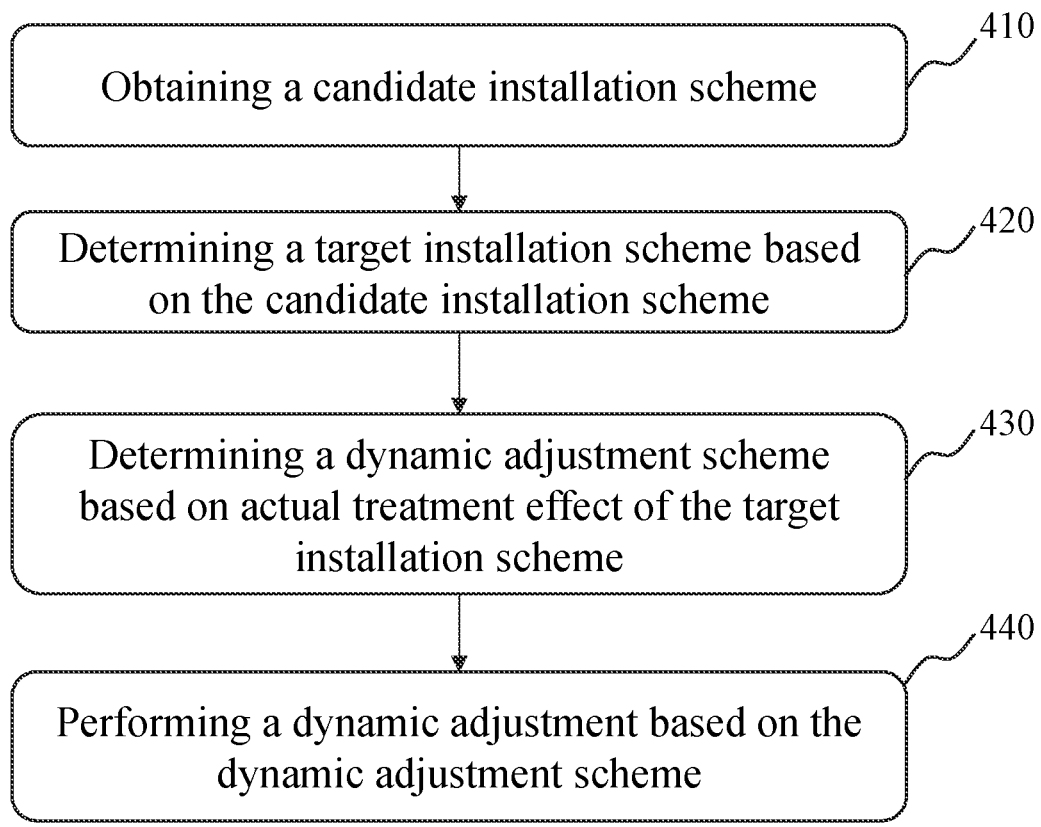
FIG. 7 is a flowchart of the dynamic adjustment method of the strip-shaped sponge biological-packing mechanism according to some embodiments of the present disclosure.

FIG. 7 is a flowchart of the dynamic adjustment method of the strip-shaped sponge biological-packing mechanism according to some embodiments of the present disclosure. In some embodiments, the process 400 may be executed by the dynamic adjustment system 300 of the strip-shaped sponge biological-packing mechanism. The process 400 includes the following steps.

Step 410: obtaining a candidate installation scheme. In some embodiments, the step 410 may be performed by the obtaining module 310.

The candidate installation scheme may refer to an installation scheme of the strip-shaped sponge biological-packing mechanism to be selected and determined, and the candidate installation scheme may be one or more groups. In some embodiments, multiple sets of parameters may be included in each set of candidate installation schemes. In some embodiments, the parameters of the candidate installation scheme may include specification parameters of the sponge, such as length, width, thickness, spacing between first through holes, etc. The parameters of the candidate installation scheme may also include installation parameters of the sponge, such as the tightness of the tension belt squeezing the sponge. The tightness of sponge may be quantified by the deformation degree of sponge before and after squeezing. Parameters of the candidate installation scheme may also include parameters of planar bracket group, such as the spacing between packing units, the total number of packing units, and the distance between two adjacent brackets in the same planar bracket group.

In some embodiments, the parameters of the candidate installation scheme may be preset. For example, the parameters of the candidate installation scheme may be preset by staff based on experience or obtained through networking. In some embodiments, each parameter in the candidate installation scheme has a corresponding preset range, for example, the length of sponge is usually within a range of 150-600 cm. In a specific embodiment, within the preset range, one value may be taken at certain intervals, and several groups of candidate installation schemes may be obtained by combining the values of different parameters.

Step 420: determining the target installation scheme based on the candidate installation scheme. In some embodiments, the step 420 may be performed by the first determination module 320.

The target installation scheme is an installation scheme of the strip-shaped sponge biological-packing mechanism which has been confirmed and selected. In some embodiments, it may be confirmed manually by the staff or automatically selected based on historical data. After the target installation scheme is determined, the strip-shaped sponge biological-packing mechanism may be installed according to the target installation scheme.

In some embodiments, the one candidate installation scheme with the best sewage treatment effect may be selected as the target installation scheme by testing the sewage treatment effects of different candidate installation schemes.

In some embodiments, the target installation scheme may be determined based on the sewage treatment effect prediction model, which may predict the sewage treatment effect of candidate installation schemes, so as to select the candidate installation scheme with the best sewage treatment effect as the target installation scheme.

The sewage treatment effect prediction model is a machine learning model. In some embodiments, the input of the sewage treatment effect prediction model may include the parameters of the candidate installation scheme, the size of the biological contact area, and the treatment object, and the output of the sewage treatment effect prediction model may include the sewage treatment effect.

In some embodiments, the parameters of the candidate installation scheme may include, but are not limited to, specification parameters the sponge, installation parameters of the sponge, and planar bracket group parameters. The size of the biological contact area may include, but not limited to, length, width, height, and effective volume. The treatment object may refer to a type of wastewater to be treated, such as dairy processing wastewater and bad exhaust gas from anoxic pond.

The sewage treatment effect may include evaluation index values, such as a sewage treatment capacity. The sewage treatment effect has different evaluation indexes according to different treatment objects. Therefore, the dimension and meaning of the output of the prediction model may be different for different inputs. For example, the effect indicators of dairy processing wastewater include a sewage treatment capacity (7 days average), a COD removal load (7 days average). The effect indicators of bad exhaust gas from anoxic pond include the emission reduction of odor indicators (ammonia, hydrogen sulfide, methyl mercaptan, etc.) (7 days average) and the odor concentration reduction (7 days average).

In some embodiments, the sewage treatment effect prediction model may be obtained by a plurality of labeled training samples. For example, a number of training samples with labels may be input into the initial sewage treatment effect prediction model, the loss function may be constructed by labels and the prediction results of the initial sewage treatment effect prediction model, and the parameters of the initial sewage treatment effect prediction model may be updated based on the iterations of the loss function. When the loss function of the initial sewage treatment effect prediction model meets the preset conditions, the preset conditions may be that the loss function converges and the number of iterations reaches the threshold.

In some embodiments, training samples may be obtained based on historical data. In some embodiments, the training samples may include parameters of historical candidate installation schemes, sizes of historical biological contact area, and historical processing objects. In some embodiments, the label may be obtained based on historical data, and the label may be the sewage treatment effect that may be achieved by manually marking the historical situation.

Step 430: determining the dynamic adjustment scheme based on the actual treatment effect of the target installation scheme. In some embodiments, the step 430 may be performed by the second determining module 330.

The actual treatment effect may refer to the actual treatment effect obtained by installing the strip-shaped sponge biological-packing mechanism based on the target installation scheme. In some embodiments, the actual treatment effect may be represented by one or more evaluation indicators, such as the sewage treatment capacity.

In some embodiments, the strip-shaped sponge biological-packing mechanism is installed based on the target installation scheme for treating with sewage. The adjustable parts of the strip-shaped sponge biological-packing mechanism may be adjusted according to the actual treatment effect. For example, when the actual treatment effect of sewage treatment is not up to expectations (for example, the COD removal rate is lower than an expected value), the spacing between adjacent packing units in the strip-shaped sponge biological-packing mechanism may be reduced, so that the packing units may contact with sewage more, thus improving the treatment effect. The adjustment may be a dynamic adjustment based on real-time processing conditions. For more details about determining the dynamic adjustment scheme based on the actual treatment effect of the target installation scheme, please refer to FIG. 8 and its relevant descriptions.

Step 440: performing a dynamic adjustment based on the dynamic adjustment scheme. In some embodiments, the step 440 may be performed by the control module 340.

In some embodiments, the parameters in the determined dynamic adjustment scheme may include, but are not limited to, the distance between adjacent brackets in the planar bracket group, the spacing between adjacent packing units, the tightness of sponge being squeezed, etc. In some embodiments, the control module 340 may adjust the distance between adjacent brackets in the planar bracket group by controlling the first adjusting mechanism, the control module 340 may adjust the spacing between adjacent packing units by controlling the second adjusting mechanism, and the control module 340 may adjust the tightness of sponge squeezed by controlling the elastic adjusting mechanism to rotate bolts.

In a specific embodiment, the strip-shaped sponge biological-packing mechanism is installed to treat sewage, and the current actual treatment effect is obtained every other cycle time, and the adjusting scheme is determined based on the actual treatment effect. If the actual treatment effect is not up to an expected effect(for example, the COD removal rate is low), the adjusting scheme may include reducing the distance between adjacent brackets in the planar bracket group, reducing the spacing between adjacent packing units, and reducing the tightness of sponge squeezed. The control module 340 may control the first adjusting mechanism to reduce the distance between adjacent brackets in the planar bracket group, the control module 340 may control the second adjusting mechanism to reduce the spacing between adjacent packing units, and the control module 340 may control the elastic adjusting mechanism to loosen bolts to reduce the tightness of sponge being squeezed.

Figure 8:
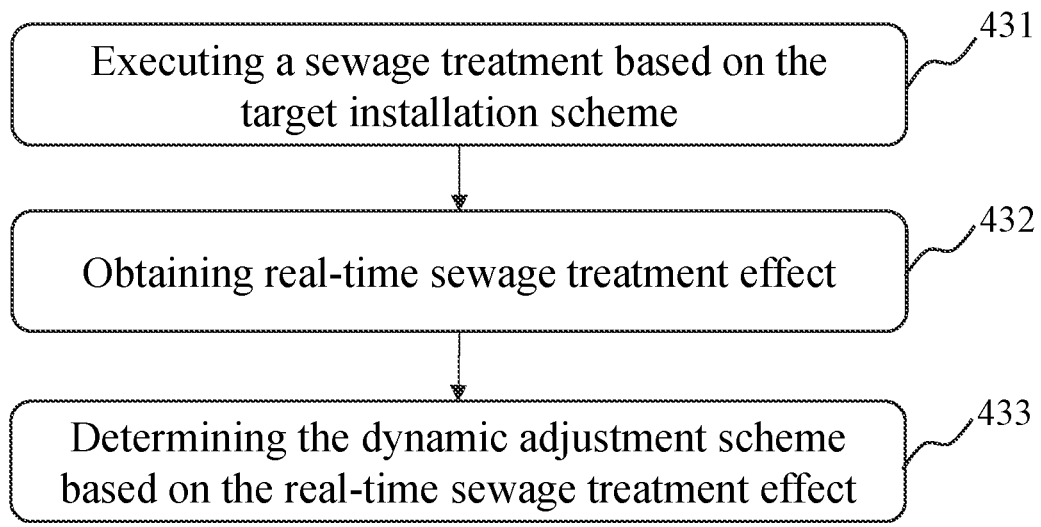
FIG. 8 is a flowchart of a dynamic adjustment method of the strip-shaped sponge biological-packing mechanism according to some embodiments of the present disclosure.

FIG. 8 is a flowchart of the dynamic adjustment method of the strip-shaped sponge biological-packing mechanism according to some embodiments of the present disclosure. In some embodiments, the step 430 may be performed by the second determining module 330. The step 430 includes the following steps.

Step 431, performing sewage treatment based on the target installation scheme.

In some embodiments, the strip-shaped sponge biological-packing mechanism may be installed according to the parameters of the target installation scheme, and the packing configuration of the mechanism may be completed according to the parameters. For the specific content and determination method of the target installation scheme, please refer to the above-mentioned related descriptions, and for the installation method, please refer to the above-mentioned installation method of the strip-shaped sponge biological-packing mechanism.

Step 432, obtaining the real-time sewage treatment effect.

In some embodiments, after the installation, the strip-shaped sponge biological-packing mechanism may be put into the sewage for sewage treatment, and the sewage treatment effect may be obtained in real time. In some embodiments, relevant indicators that may reflect the sewage treatment effect, such as a sewage treatment capacity, may be obtained at fixed intervals.

Step 433: determining the dynamic adjustment scheme based on the real-time sewage treatment effect.

In some embodiments, the expected sewage treatment effect (i.e., the target sewage treatment effect) may be set in advance based on experience or historical data. If the obtained real-time sewage treatment effect does not reach the expected sewage treatment effect, the parameters of the strip-shaped sponge biological-packing mechanism may be dynamically adjusted, so that the expected or better sewage treatment effect may be achieved.

In some embodiments, the dynamic adjustment scheme may be adjusted based on historical experience or random small amplitude. It should be noted that the dynamic adjustment is only for some parameters. For example, the length, width, thickness, the spacing of the first through hole, and other specifications of the sponge may not be adjusted, but the tightness of the sponge squeezed and the spacing between packing units may be adjusted.

Figure 9:
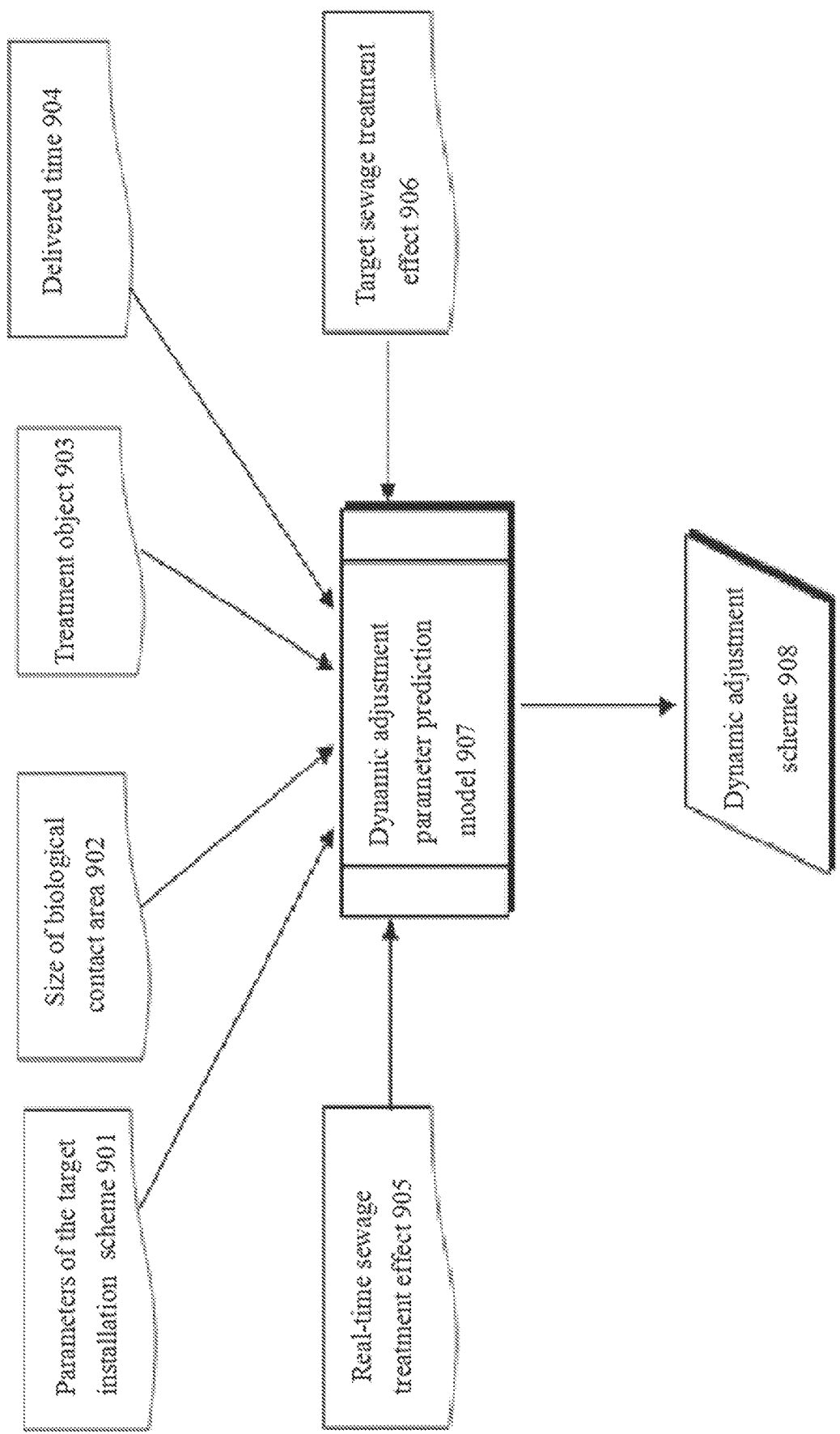
FIG. 9 is a schematic diagram of a dynamic adjustment parameter prediction model according to some embodiments of the present disclosure.

FIG. 9 is a schematic diagram of a dynamic adjustment parameter prediction model according to some embodiments of the present disclosure. As shown in FIG. 9, in some embodiments, the dynamic adjustment scheme may also be determined based on a dynamic adjustment parameter prediction model 907. The dynamic adjustment parameter prediction model 907 may predict in real time (for example, once every fixed period). When it is determined that the real-time sewage treatment effect has reached the target sewage treatment effect by the prediction model, the parameters in the dynamic adjustment scheme output by the prediction model may all be 0, which means no increase or decrease, that is, no adjustment.

The dynamic adjustment parameter prediction model 907 may be a machine learning model. In some embodiments, the input of the dynamic adjustment parameter prediction model 907 may include the parameters of the target installation scheme 901, the size of biological contact area 902, the treatment object 903, the delivered time 904, the real-time sewage treatment effect 905, and the target sewage treatment effect 906, and the output of the dynamic adjustment parameter prediction model 907 may be the dynamic adjustment scheme 908. The output dynamic adjustment scheme 908 may only include adjustable parameters, for example, the tightness of the sponge squeeze, the spacing between packing units, etc.

Parameters of the target installation scheme 901 may include, but are not limited to, specification parameters of the sponge, installation parameters of the sponge, and parameters of the planar bracket group. The size of the biological contact area 902 may include, but is not limited to, length, width, height, and effective volume. The treatment object 903 may refer to the type of wastewater to be treated, such as dairy processing wastewater. The delivered time 904 is duration that the strip-shaped sponge biological-packing mechanism is put into sewage, and the sewage treatment effect will change with the duration. The real-time sewage treatment effect 905 refers to the sewage treatment effect at the current time node, or an average value from the time of delivery to the current time node. The target sewage treatment effect 906 refers to the expected sewage treatment effect at the current time node, or the average value from the time of delivery to the current time node. The sewage treatment effect is reflected by the evaluation index value, for example, the sewage treatment capacity, etc.

In some embodiments, the dynamic adjustment parameter prediction model may be obtained by a plurality of labeled training samples. For example, a number of training samples with labels may be input into the initial dynamic adjustment parameter prediction model, and the loss function may be constructed by the labels and the prediction results of the initial dynamic adjustment parameter prediction model, and the parameters of the initial dynamic adjustment parameter prediction model may be updated based on the iterations of the loss function. When the loss function of the initial dynamic adjustment parameter prediction model meets the preset conditions, the preset conditions may be that the loss function converges, the number of iterations reaches the threshold, etc.

In some embodiments, training samples may be obtained from historical data. The training sample may include relevant data of sewage treatment based on the target installation scheme in history. In some embodiments, the labels may be obtained from historical data. The labels may be determined by manual labeling, including the adjustment value of tightness and the adjustment value of the spacing of the packing unit that may achieve the target sewage treatment effect in historical situations.

In order to further explore the effect of the present disclosure, two batches of corresponding tests are conducted. The first batch of tests is divided into four test groups, the first group is test group 1, which adopts the technical scheme of the above embodiment for operation, and the other three groups are control group 1, control group 2, and control group 3, respectively, the sponge 3 in the embodiment is made of polyurethane foam material, the control group 1 uses spherical sponge packing, the control group 2 uses elastic open-cell foam to suspend biological packing, and the control group 3 uses ordinary elastic packing, which are installed in four biological contact oxidation sewage treatment systems respectively to treat organic COD in dairy processing sewage as well. The technical parameters of packing, biofilm formation speed, and COD removal efficiency of organic matter are compared and analyzed. The specific setting parameters and pollution treatment effect are shown in Table 1:

TABLE 1

Comparison of packing parameters of the sponge and pollution treatment effect in the first batch test

| Test group | Test group 1 | Control group 1 | Control group 2 | Control group 3 |
|---|---|---|---|---|
| Parameters of biological contact area of biological contact oxidation device | a size of biological contact area: a length of 100 cm, a width of 100 cm, a height of 300 cm, an effective volume of 3 m³ | a size of biological contact area: a length of 100 cm, a width of 100 cm, a height of 300 cm, an effective volume of 3 m³ | a size of biological contact area: a length of 100 cm, a width of 100 cm, a height of 300 cm, an effective volume of 3 m³ | a size of biological contact area: a length of 100 cm, a width of 100 cm, a height of 300 cm, an effective volume of 3 m³ |
| Packing characteristics and parameters | material: polyurethane foam material, a density of 20 kg/m³, a diameter of foamed filament of 0.002 cm, a specific surface area of 1818 m²/m³ (foaming sponge) shape: black strip-shaped sponge strip size: a length of 300 cm, a width of 15 cm, a thickness of 2.0 cm, a ratio of the width to the thickness of 7.5:1 fixing method: clamping the middle of the sponge with the upper and lower tension belts 4 and fix it with stainless steel hat-peg installation method of the packing: two ends of packing are vertically bound to the support 1 arranged in parallel up and down to form a packing combination, a spacing the packing installation of 10 cm, the spacing between upper and lower supports 1 of 300 cm, and a plane spacing of 15 cm, the support 1 being made of D20 galvanized round steel main technical indicators: based on 66 strip-shaped sponge biological packing installed in the 3 m³ biological contact oxidation treatment device, a volume ratio of sponge of 19.8%, a specific surface area of biological-packing area of 360 m²/m³ (packing area) | material: polyurethane foam material, a density of 20 kg/m³, a diameter of foamed filament of 0.002 cm, a specific surface area of 1818 m²/m³ (foaming sponge) shape: black cube porous sponge cube size: a length of 3 cm, a width of 3 cm, a height of 3 cm fixing method: four black cube porous sponges are placed in two hollow mesh hemispheres made of plastic with a diameter of 12 cm, and then the mesh hemispheres are connected to a slot arranged at the interface to form a spherical packing installation method of the packing: the spherical packing is piled up on the solid corrosion-resistant metal support 1 with a grid, the grid aperture of which is smaller than the diameter of the spherical packing, and the packing stacking height is 160 cm. A packing grid protection net is set on the plane 300 cm above the grid metal support 1 (the space of 140 cm in static state is the fluidized state of the packing during operation, which is the flow area between the spherical packing), and the grid aperture is smaller than the diameter of the spherical packing, so as to prevent the packing from losing during aeration main technical | material: polyurethane foam material, a density of 20 kg/m³, a diameter of foamed filament of 0.002 cm, a specific surface area of 1818 m²/m³ (foaming sponge) shape: black lath-shaped porous sponge lath size: a length of 20 cm, a width of 4 cm, a thickness of 2 cm fixing method: the packing slats aggregate is made of several slats perpendicular to the adhesive ropes and embedded between the adhesive ropes along the midline with a distance of 2 cm; a length of a single packing of 300 cm, and a number of slats of 75 installation method of the packing: two ends of packing are vertically bound to the support 1 arranged in parallel up and down to form a packing combination, a spacing the packing installation of 20 cm, the spacing between upper and lower supports 1 of 300 cm, and a plane spacing of 20 cm, the support 1 being made of D20 galvanized round steel. main technical indicators: based on 25 elastic open-cell foam biological-packings with a diameter of 20 cm are installed in a 3 m³ biological contact oxidation treatment device, the number of slats is 75, a volume ratio of sponge of 10%, a specific surface area of biologic al- | material: polypropylene, a density of 900 kg/m³ shape: white filiform size: a diameter of polypropylene filament of 0.02 cm, a length of 15 cm; fixing method: polypropylene filaments are inserted and fixed on the tension rope at different angles in the vertical direction of the tight rope, forming a cylindrical brush-like packing with polypropylene filaments as radiation strips with the tight rope as the center, and the length of a single packing is 300 cm installation method of the packing: two ends of packing are vertically bound to the support 1 arranged in parallel up and down to form a packing combination, a spacing the packing installation of 15 cm, the spacing between upper and lower supports 1 of 300 cm, and a plane spacing of 15 cm, the support 1 being made of D20 galvanized round steel main technical indicators: based on 44 elastic packings with a diameter of 15 cm are installed in a 3 m³ biological contact oxidation treatment device, a weight ratio of polypropylene filaments in the packing area of 3 kg/m³ (packing area), with 12057 polypropylene filaments per packing, with a total specific surface area of 100 m² and a |

TABLE 1-continued

Comparison of packing parameters of the sponge and pollution treatment effect in the first batch test

| Test group | Test group 1 | Control group 1 | Control group 2 | Control group 3 |
|---|---|---|---|---|
| | | indicators: based on 1000 spherical packings with a diameter of 12 cm are installed in a 3 $m^3$ biological contact oxidation treatment device, and each spherical packing contains 4 cubic sponge meters with a side length of 3 cm; a volume ratio of sponges of 3.6%, a specific surface area of biological-packing area of 65.5 $m^2/m^3$ (packing area) | packing area of 182 $m^2/m^3$ (packing area) | specific surface area of 33.33 $m^2/m^3$ (packing area) |
| Control index of biological contact oxidation treatment | treatment object: dairy processing wastewater with an initial COD concentration of 676 mg/L Strain addition: an initial sedimentation ratio of 12-15% aeration dissolved oxygen control: 2-3 mg/L nutrient guarantee: in the fattening stage, detecting COD every day, adding dairy sewage every day, and controlling the COD within a range of 200-300 mg/L; in the operation stage, controlling the COD of effluent within a range of 70-90 mg/L, and an average detection COD of 82.7 mg/L in 7 days | treatment object: dairy processing wastewater with an initial COD concentration of 676 mg/L Strain addition: an initial sedimentation ratio of 12-15% aeration dissolved oxygen control: 2-3 mg/L nutrient guarantee: in the fattening stage, detecting COD every day, adding dairy sewage every day, and controlling the COD within a range of 200-300 mg/L; in the operation stage, controlling the COD of effluent within a range of 70-90 mg/L, and an average detection COD of 76.2 mg/L in 7 days | treatment object: dairy processing wastewater with an initial COD concentration of 676 mg/L. Strain addition: an initial sedimentation ratio of 12-15% aeration dissolved oxygen control: 2-3 mg/L nutrient guarantee: in the fattening stage, detecting COD every day, adding dairy sewage every day, and controlling the COD within a range of 200-300 mg/L; in the operation stage, controlling the COD of effluent within a range of 70-90 mg/L, and an average detection COD of 85 mg/L in 7 days | treatment object: dairy processing wastewater with an initial COD concentration of 676 mg/L Strain addition: an initial sedimentation ratio of 12-15% aeration dissolved oxygen control: 2-3 mg/L nutrient guarantee: in the fattening stage, detecting COD every day, adding dairy sewage every day, and controlling the COD within a range of 200-300 mg/L; in the operation stage, controlling the COD of effluent within a range of 70-90 mg/L, and an average detection COD of 75.8 mg/L in 7 days |
| Biofilm culture speed of biological contact oxidation treatment | 1. after aerating for 2 days, the attached seeds being produced around the sponge silk 2. after aerating for 7 days, a biofilm being formed around the sponge silk 3. after aerating for 12 days, the biofilm around the sponge silk thickening to about 1 cm, and the cultivation is basically completed | 1. after aerating for 2 days, the attached seeds being produced around the sponge silk 2. after aerating for 7 days, a biofilm being formed around the sponge silk 3. after aerating for 12 days, the biofilm around the sponge silk thickening to about 1 cm, and the cultivation is basically completed | 1. after aerating for 2 days, the attached seeds being produced around the sponge silk 2. after aerating for 7 days, a biofilm being formed around the sponge silk 3. after aerating for 12 days, the biofilm around the sponge silk thickening to about 1 cm, and the cultivation is basically completed | 1. after aerating for 5 days, the attached seeds being produced around the sponge silk 2. after aerating for 15 days, a biofilm being formed around the sponge silk 3. after aerating for 28 days, the biofilm around the sponge silk thickening to about 0.6 cm, and the cultivation is basically completed |

TABLE 1-continued

Comparison of packing parameters of the sponge and pollution treatment effect in the first batch test

| Test group | Test group 1 | Control group 1 | Control group 2 | Control group 3 |
|---|---|---|---|---|
| Normal biological contact oxidation treatment capacity | 1. Sewage treatment capacity: 8.90 $m^3$ on average in 7 days<br>2. COD removal load: 5.28 $kg/m^3 \cdot d$ | 1. Sewage treatment capacity: 8.90 $m^3$ on average in 7 days<br>2. COD removal load: 2.25 $kg/m^3 \cdot d$ | 1. Sewage treatment capacity: 8.90 $m^3$ on average in 7 days<br>2. COD removal load: 3.48 $kg/m^3 \cdot d$ | 1. Sewage treatment capacity: 8.90 $m^3$ on average in 7 days<br>2. COD removal load: 1.7 $kg/m^3 \cdot d$ |
| Evaluation ranking | 1 | 3 | 2 | 4 |

It can be seen From Table 1 that biological contact oxidation treatment capacity of test group 1 is significantly different from that of control groups 1, 2 and 3 in normal operation. In the test group 1, the 7 days average sewage treatment capacity is the highest, which is 8.90 $m^3$, and the COD removal load is the highest, which is 5.28 $kg/m^3$.d. It can be seen that test group 1 has the best pollution treatment effect, and its effect is better than that of control groups 1, 2 and 3 using the prior art.

The second batch of tests is divided into three test groups, the first group is the test group 2, which adopts the technical scheme of the above embodiment for operation, and the other two groups are the control group 4 and the control group 5. The sponge 3 of the first group is made of polyurethane foam material, the control group 4 uses spherical sponge packing and the control group 5 uses ordinary elastic packing, which are respectively installed in three biological contact oxidation systems for treating the odorous waste gas from the anoxic tank of domestic sewage to treat the organic COD in dairy processing sewage as well. The technical parameters of packing, biofilm formation speed, and COD removal efficiency of organic matter are compared and analyzed. The specific setting parameters and pollution treatment effect are shown in Table 2.

TABLE 2

Comparison table of packing parameters of the sponge and pollution treatment effect in the second batch test

| Test group | Test group 2 | Control group 5 | Control group 6 |
|---|---|---|---|
| Parameters of biological contact area of biological contact oxidation device | a size of biological contact area: a length of 100 cm, width of 100 cm, a height of 300 cm, an effective volume of 3 $m^3$ | a size of biological contact area: a length of 100 cm, width of 100 cm, a height of 300 cm, an effective volume of 3 $m^3$ | a size of biological contact area: length of 100 cm, width of 100 cm, a height of 300 cm, an effective volume of 3 $m^3$ |
| Packing characteristics and parameters | material: polyurethane foam material, a density 20 $kg/m^3$, a diameter of foamed filament of 0.002 cm, a specific surface area of 1818 $m^2/m^3$ (foaming sponge) shape: black strip-shaped sponge strip size: a length of 300 cm, a width of 15 cm, a thickness of 2.0 cm; a ratio of the width to the thickness of 7.5:1 fixing method: clamping the middle of the sponge with the upper and lower tension belts 4 and fixing it with stainless steel hat-peg installation method of the packing: two ends of packing are vertically bound to the support 1 arranged in parallel up and down to form a packing combination, a spacing the packing installation of 10 cm, the spacing between upper and lower supports 1 of 300 cm, and a plane spacing of 15 cm, the support 1 being made of D20 galvanized round steel main technical indicators: based on 66 strips of strip- | material: polyurethane foam material, a density 20 $Kg/m^3$, a diameter of foamed filament of 0.002 cm, a specific surface area of 1818 $m^2/m^3$ (foaming sponge) shape: black cube porous sponge cube size: a length of 3 cm, a width of 3 cm, a height of 3 cm fixing method: four black square porous sponges are placed in two hollow mesh hemispheres made of plastic with a diameter of 12 cm, and then the mesh hemispheres are connected to form a spherical packing by a slot arranged at the interface installation method of the packing: the spherical packing is piled up on the solid corrosion-resistant metal support 1 with a grid, the grid aperture of which is smaller than the diameter of the spherical packing, and the packing stacking height is 160 cm. A packing grid protection net is set on the plane 300 cm above the grid metal support 1 (the space | material: polypropylene density: 900 $kg/m^3$ shape: white filiform Size: a diameter of polypropylene filament 0.02 cm, a length of 15 cm fixing method: polypropylene filaments are inserted and fixed on the tension rope at different angles in the vertical direction of the tight rope, forming a cylindrical brush-like packing with polypropylene filaments as radiation strips with the tight rope as the center, and the length of a single packing is 300 cm installation method of the packing: two ends of packing are vertically bound to the support 1 arranged in parallel up and down to form a packing combination, a spacing the packing installation of 15 cm, the spacing between upper and lower supports 1 of 300 cm, and a plane spacing of 15 cm, the support 1 being made of D20 galvanized round steel main technical indicators: based on 44 elastic |

TABLE 2-continued

Comparison table of packing parameters of the sponge and pollution treatment effect in the second batch test

| Test group | Test group 2 | Control group 5 | Control group 6 |
|---|---|---|---|
| | shaped sponge biological-packing are installed in the 3 m³ biological contact oxidation treatment device, a volume ratio of sponge of 19.8%, a specific surface area of biological-packing area of 360 m²/m³ (packing area) | of 140 cm in static state is the fluidized state of the packing during operation, which is the flow area between the spherical packing), and the grid aperture is smaller than the diameter of the spherical packing, so as to prevent the packing from losing during aeration main technical indicators: based on 1,000 spherical packings with a diameter of 12 cm are installed in a 3 m³ biological contact oxidation treatment device, and each spherical packing contains 4 cubic sponge meters with a side length of 3 cm; a volume ratio of sponges of 3.6%, a specific surface area of biological-packing area of 65.5 m²/m³ (packing area) | packings with a diameter of 15 cm are installed in a 3 m³ biological contact oxidation treatment device, and the weight ratio of polypropylene filaments in the packing area is 3 kg/m³ (packing area), with 12,057 polypropylene filaments per packing, with a total specific surface area of 100 m² and a specific surface area of 33.33 m²/m³ (packing area) |
| Control index of biological contact oxidation treatment | Treatment object: the bad waste gas from anoxic pond, the initial discharge: ammonia 15.5 kg/h, hydrogen sulfide 1.37 kg/h, methyl mercaptan 0.05 kg/h, odor concentration 4096 (dimensionless) device characteristics: the bottom part is a biological water spray receiving tank, the middle part is a biological contact packing combination area, and the upper part is a biological water spray nozzle combination; the bottom biological water is lifted to the spray nozzle by a circulating pump, and continuously and circularly sprayed; waste gas enters from the upper part of the receiving tank and the lower part of the packing bracket 1, and is discharged from the top of the spray nozzle strain addition: an initial sedimentation ratio of 12-15% nutrient guarantee: detecting COD every day, adding dairy sewage every day, and controlling the COD within a range of 200-300 mg/L; controlling the COD of effluent within a range of 100-200 mg/L, and an average detection COD of 153.2 mg/L for 7 consecutive days | Treatment object: the bad waste gas from anoxic pond, the initial discharge: ammonia 15.5 kg/h, hydrogen sulfide 1.37 kg/h, methyl mercaptan 0.05 kg/h, odor concentration 4096 (dimensionless). device characteristics: the bottom part is a biological water spray receiving tank, the middle part is a biological contact packing combination area, and the upper part is a biological water spray nozzle combination; the bottom biological water is lifted to the spray nozzle by a circulating pump, and continuously and circularly sprayed; waste gas enters from the upper part of the receiving tank and the lower part of the packing bracket 1, and is discharged from the top of the spray nozzle strain addition: an initial sedimentation ratio of 12-15% Aeration dissolved oxygen control: 2-3 mg/L nutrient guarantee: detecting COD every day, adding dairy sewage every day, and controlling the COD within a range of 200-300 mg/L; controlling the COD of effluent within a range of 100-200 mg/L, and an average detection COD of 136.3 mg/L for 7 consecutive days | Treatment object: the bad waste gas from anoxic pond, the initial discharge: ammonia 15.5 kg/h, hydrogen sulfide 1.37 kg/h, methyl mercaptan 0.05 kg/h, odor concentration 4096 (dimensionless) device characteristics: the bottom part is a biological water spray receiving tank, the middle part is a biological contact packing combination area, and the upper part is a biological water spray nozzle combination; the bottom biological water is lifted to the spray nozzle by a circulating pump, and continuously and circularly sprayed; waste gas enters from the upper part of the receiving tank and the lower part of the packing bracket 1, and is discharged from the top of the spray nozzle strain addition: an initial sedimentation ratio of 12-15% Aeration dissolved oxygen control: 2-3 mg/L nutrient guarantee: detecting COD every day, adding dairy sewage every day, and controlling the COD within a range of 200-300 mg/L; controlling the COD of effluent within a range of 100-200 mg/L, and an average detection COD of 165.8 mg/L for 7 consecutive days |
| Biofilm culture speed of biological oxidation treatment | 1. Cultivate sponges for 1 day, there are attached seeds around the silk; 2. Cultivate sponges for 5 days, biofilm is formed around the silk; | 1. Cultivate sponges for 1 day, there are attached seeds around the silk; 2. Cultivate sponges for 5 days, biofilm is formed around the silk; | 1. Cultivate sponges for 3 days, there are attached seeds around the silk; 2. Cultivate the sponge for 12 days, biofilm is formed around the silk; |

TABLE 2-continued

Comparison table of packing parameters of the sponge and
pollution treatment effect in the second batch test

| Test group | Test group 2 | Control group 5 | Control group 6 |
|---|---|---|---|
| Normal biological contact oxidation treatment capacity | 3. Cultivate the sponge for 15 days, the biofilm around the silk thickens to about 0.5 cm, and the cultivation is basically completed. target odor discharge (7 days average): ammonia 1.57 kg/h, hydrogen sulfide 0.182 kg/h, methyl mercaptan 0.012 kg/h, odor concentration 512 (dimensionless) | 3. Sponge aerated for 15 days, the peripheral biofilm thickened to about 0.5 cm, and the cultivation was basically completed. target odor discharge (7 days average): ammonia 4.46 kg/h, hydrogen sulfide 0.252 kg/h, methyl mercaptan 0.01 kg/h, odor concentration 1024 (dimensionless) | 3. Cultivate the sponge for 30 days, the biofilm around the silk thickens to about 0.3 cm, and the cultivation is basically completed. target odor discharge (7 days average): ammonia 5.33 kg/h, hydrogen sulfide 0.384 kg/h, methyl mercaptan 0.02 kg/h, odor concentration 2048 (dimensionless) |
| Evaluation ranking | 1 | 2 | 3 |

It can be seen from Table 2 that the biological contact oxidation treatment capacity of test group 2 is significantly difference that of control groups 5 and 6 in the normal operation. In the biological contact oxidation treatment capacity of test group 2 of the normal operation, and the 7 days average odor index emissions: the emissions of ammonia and hydrogen sulfide are the lowest, and the emissions of methyl mercaptan are also low and there is little difference compared with control group 5, and the odor concentration of 512 is also the lowest. From the point of view of pollution treatment effect, in the second batch of tests, the pollution treatment effect of test group 2 is the best. Compared with the control group 5 and the control group 6 adopting the prior art, the effect has been significantly improved.

The beneficial effects of the strip-shaped sponge biological-packing mechanism provided by some embodiments of the present disclosure include but are not limited to: (1) the sponge directly contacts with sewage or surrounding air, there is no stagnant area, and there is no static sludge deposition space around the sponge, which will not produce sludge deposition around the sponge, thus solving the problem that biochemical sludge is easy to deposit in the gaps of spherical or square sponges; (2) The sponge may directly transport the oxygen in the air or water to the surface of the biological membrane for direct air supply, which may improve the oxygen supply rate, reduce the oxygen supply cost and solve the problem of contact absorption of dissolved oxygen; (3) The quantity of single packing sponge is large, and the volume ratio of biofilm (including sponge and biofilm with a thickness of 1 cm outside the biofilm) may reach 15-45% after combined operation, and the volume ratio of the device is greatly improved; (4) the process cost is low, the installation is convenient, the manufacturing and installation cost is save by more than 30% according to the packing cost per cubic meter, and the problem that high cost is difficult to popularize and use in a large range is solved; (5) Predicting the effect of the installation scheme through the model and determining the best installation scheme for installation may improve the efficiency; (6) The model predicts the treatment effect, which is convenient to adjust the device parameters in real time, so as to maximize the treatment effect. It should be noted that different embodiments may produce different beneficial effects. In different embodiments, the possible beneficial effects may be any one or a combination of several of the above, or any other possible beneficial effects.

Having described the basic concepts above, it is obvious to those skilled in the art that the above detailed disclosure is only an example, which does not constitute a limitation on the present disclosure. Although not explicitly stated here, those skilled in the art may make various modifications, improvements and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. Such as "one embodiment" and/or "some embodiments" mean a certain characteristic, structure or characteristic related to at least one embodiment of the present disclosure. Therefore, it should be emphasized and noted that "one embodiment" or "one alternative embodiment" mentioned twice or more in different places in the present disclosure do not necessarily mean the same embodiment. In addition, some characteristics, structures or characteristics in one or more embodiments of the present disclosure may be combined appropriately.

In addition, unless explicitly stated in the claims, the order of processing elements and sequences, the use of numerals and letters, or other names mentioned in the present disclosure are not used to limit the order of the flow and method of the present disclosure. Although some currently considered useful embodiments are discussed through various examples in the above disclosure, it should be understood that such details are for the purpose of illustration only, and the appended claims are not limited to the disclosed embodiments. On the contrary, the claims are intended to cover all modifications and equivalent combinations that conform to the spirit and scope of the embodiments of the present disclosure. For example, although the above-described system components may be realized by hardware devices, they may also be realized only by software solutions, such as installing the described system on an existing server or mobile device.

Similarly, it should be noted that, in order to simplify the expression disclosed in the present disclosure, so as to facilitate the understanding of one or more embodiments, in the foregoing description of the embodiments of the present disclosure, sometimes various characteristics are combined into one embodiment, figures or descriptions thereof. However, this disclosure method does not mean that the characteristics required by the object of the present disclosure are more than those mentioned in the claims. Actually, the characteristics of the embodiment are less than all the characteristics of the single embodiment disclosed above.

In some examples, numbers describing the number of ingredients and attributes are used. It should be understood that such numbers used in the description of embodiments are modified by modifiers "about", "approximately" or "substantially" in some examples. Unless otherwise stated, "about", "approximately" or "substantially" means that the number is allowed to vary by 20%. Accordingly, in some embodiments, the numerical parameters used in the specification and claims are approximate values, and the approximate values may be changed according to the required characteristics of individual embodiments. In some embodiments, the specified significant digits should be taken into account for the numerical parameters, and the general digit reservation method should be adopted. Although in some embodiments of the present disclosure, the numerical fields and parameters used to confirm the range breadth are approximate values, in specific embodiments, the setting of such numerical values is as accurate as possible within the feasible range.

For each patent, patent application, publication of patent application, and other materials cited in the present disclosure, such as articles, books, specifications, publications, documents, etc., the entire contents are hereby incorporated into the present disclosure as a reference. Excepting the application history documents that are inconsistent or conflict with the contents of the present disclosure, and the documents that restrict the widest scope of the claims of the present disclosure (currently or later attached to the present disclosure). It should be noted that if there is any inconsistency or conflict between the descriptions, definitions, and/or terms used in the supplementary materials of the present disclosure and the contents of the present disclosure, the descriptions, definitions, and/or terms used in the present disclosure shall prevail.

Finally, it should be understood that the embodiments described in the present disclosure are only used to illustrate the principles of the embodiments of the present disclosure. Other variations may also fall within the scope of the present disclosure. Therefore, by way of example and not limitation, alternative configurations of embodiments of the present disclosure may be regarded as consistent with the teachings of the present disclosure. Accordingly, the embodiments of the present disclosure are not limited to those explicitly introduced and described in the present disclosure.

What is claimed is:

1. A strip-shaped sponge biological-packing mechanism, comprising at least two layers of planar bracket groups longitudinally distributed and parallel to each other, wherein
the planar bracket groups include at least three brackets which are parallel to each other or distributed in a grid shape; the brackets between upper and lower adjacent planar bracket groups are in one-to-one correspondence; a plurality of packing units arranged along a length direction of the brackets are arranged between upper and lower adjacent brackets; the packing units include sponges with a strip-shaped structure; two sides of a sponge are respectively provided with a tension belt arranged along a length direction of the sponge; two ends of the tension belt respectively extend outwards relative to two ends of the sponge, and a plurality of fasteners distributed along the length direction of the sponge for fixing the sponges are arranged between two tension belts; the two ends of the tension belt are respectively fixedly provided with a fastening, and the fastenings at both ends of the tension belt are detachably connected with two brackets respectively.

2. The strip-shaped sponge biological-packing mechanism according to claim 1, wherein the sponges are provided with a plurality of first through holes distributed along the length direction of the sponge; the tension belts are provided with a plurality of second through holes corresponding to the first through holes one by one; the fasteners are hat-pegs with a dumbbell-shaped structure; middle parts of the hat-pegs are sleeved in the first through holes and the second through holes; protruding parts relative to the middle parts of two ends of the hat-pegs are respectively attached to outer sides of the two tension belts; and a distance between adjacent fasteners is within a range of 20-100 cm.

3. The strip-shaped sponge biological-packing mechanism according to claim 1, wherein the fasteners are strip-shaped sewing threads arranged along the length direction of the sponge; the strip-shaped sewing threads pass through the two tension belts and the sponge, and the strip-shaped sewing threads are continuously sewn or sewed in sections at a spacing within a range of 20-100 cm.

4. The strip-shaped sponge biological-packing mechanism according to claim 1, wherein the tension belt is made of plastic, nylon, or metal.

5. The strip-shaped sponge biological-packing mechanism according to claim 1, wherein corresponding ends of the two tension belts are fixedly connected, and the corresponding ends of the two tension belts are fixedly connected with the fastening at the same time.

6. The strip-shaped sponge biological-packing mechanism according to claim 5, wherein the fastening is a hook which is hooked on the bracket or a binding head formed by extension sections at both ends of the tension belt directly bound to the bracket.

7. The strip-shaped sponge biological-packing mechanism according to claim 1, wherein a length of the sponge is within a range of 150-600 cm, a width of the sponge is within a range of 5-20 cm, a thickness of the sponge is within a range of 0.6-3 cm, and a width of the tension belt is within a range of 0.5-3 cm.

8. The strip-shaped sponge biological-packing mechanism according to claim 3, wherein a spacing between adjacent packing units on the same upper and lower adjacent brackets is within a range of 4-15 cm, and a distance between two adjacent brackets in the same planar bracket group is within a range of 5-20 cm.

9. The strip-shaped sponge biological-packing mechanism according to claim 1, wherein the planar bracket group includes a first adjusting mechanism and a second adjusting mechanism; the first adjusting mechanism adjusts a distance between adjacent brackets in the same planar bracket group, and the second adjusting mechanism adjusts a spacing between adjacent packing units.

10. The strip-shaped sponge biological-packing mechanism according to claim 1, wherein a bolt is arranged at a tail end of the fastener, and the bolt is connected with an elastic adjusting mechanism, and the elastic adjusting mechanism adjusts a tightness of the fastener squeezing the sponge by rotating the bolt.

11. An installation method of a strip-shaped sponge biological-packing mechanism, comprising:
tightly attaching a tension belt to two sides of a sponge with a strip-shaped structure respectively, so that two ends of the tension belt protrude relative to two ends of the sponge respectively; fixing the sponge between two tension belts by a fastener, and fixedly connecting corresponding ends of the two tension belts and fixing the corresponding ends of the two tension belts on a fastening, so as to form a packing unit;

fixedly installing brackets distributed in a rectangular array in a biological contact area of the biological contact oxidation treatment device for treating wastewater and waste gas by a biological contact method, so as to form at least two layers of planar bracket groups distributed longitudinally and parallel to each other, cause a distance between two adjacent brackets in the same planar bracket group being within a range of 5-20 cm, and cause the brackets between upper and lower adjacent planar bracket groups being in one-to-one correspondence; and installing packing units vertically on upper and lower adjacent brackets in a tight manner from top to bottom through two fastenings in a hooking or a binding manner, and installing a plurality of packing units between the upper and lower adjacent brackets in the same manner along a length direction of the brackets, so that all packing units are distributed in the rectangular array, and controlling a spacing between adjacent packing units on the same upper and lower adjacent brackets to be within a range of 4-15 cm.

* * * * *